United States Patent [19]
Chou et al.

[11] Patent Number: 5,081,676
[45] Date of Patent: Jan. 14, 1992

[54] METHOD AND APPARATUS FOR PROTECTING MULTIPLE COPIES OF COMPUTER SOFTWARE FROM UNAUTHORIZED USE

[76] Inventors: Wayne W. Chou, 25 Hauley Pl., Ridgefield, Conn. 06877; Richard Erett, 278 Russet Rd., Stamford, Conn. 06903; Joseph M. Kulinets, 126 Hoyt St., Apt. 5J, Stamford, Conn. 06905

[21] Appl. No.: 592,808

[22] Filed: Oct. 4, 1990

[51] Int. Cl.5 .......................... H04L 9/00; H04L 9/02
[52] U.S. Cl. .......................................... 380/4; 380/21; 380/44; 380/45; 380/47
[58] Field of Search ............... 380/3, 4, 21, 23, 44, 380/47, 45, 50, 52

[56] References Cited
U.S. PATENT DOCUMENTS

| | | | |
|---|---|---|---|
| 3,806,882 | 4/1974 | Clarke | 340/172.5 |
| 4,446,519 | 5/1984 | Thomas | 364/300 |
| 4,458,315 | 7/1984 | Uchenick | 364/200 |
| 4,471,163 | 9/1984 | Donald et al. | 364/200 X |
| 4,562,306 | 12/1985 | Chou et al. | 364/300 X |
| 4,593,353 | 6/1986 | Pickholtz | 364/200 |
| 4,634,808 | 1/1987 | Moerder | 380/20 |
| 4,932,054 | 6/1990 | Chou et al. | 380/4 |
| 4,935,962 | 6/1990 | Austin | 380/50 X |
| 4,959,861 | 9/1990 | Howlette | 380/4 |

Primary Examiner—Stephen C. Buczinski

[57] ABSTRACT

A hardware device containing a first permanent key and a second key is plugged in a specified port of a computer to establish a communication path between the hardware device and computer. The first and second keys are presented with an access sequence from the computer in the software which is desired to be controlled generating outputs which are applied to an algorithm decoder which provides a control key which is used to protect the software from unauthorized use. The control key is the resultant of the algorithm decoder and the first and second keys. One of the keys is supplied with the hardware under the control of the developer whereas the second key may be supplied with the hardware device but is not restricted to the hardware device and may be entered through a separate port of the computer. The algorithm decoder can be included in any part of the software, the computer hardware or any combination thereof. Many combinations of the first and second keys may be designed to produce the same control key when decoded. One of the keys may be altered without regard to security, but there are certain values of the second key for each given value of the first key which will operate the software. Providing a plurality of first and matching second keys which produce the plurality of different valid control keys allows the use of additional software that works in conjunction with the original distributed software acquired at a later date without the addition of additional hardware device.

2 Claims, 2 Drawing Sheets

METHOD AND APPARATUS FOR PROTECTING MULTIPLE COPIES OF COMPUTER SOFTWARE FROM UNAUTHORIZED USE

BACKGROUND OF THE INVENTION

This invention relates to the protection of computer software, and more particularly to a combination of software and hardware components which software when executed in a prescribed manner generates first and second keys which when processed by an algorithm decoder produce a control key used to protect the software from unauthorized use.

Hardware protected software programs are generally sold to end users who receive a distribution diskette containing the desired program and a hardware device which contains a matching key. In order to operate the software, the supplied hardware portion is plugged into a specified port of the computer establishing a communications path between the hardware device and the computer. If the hardware contains the correct code which constitutes the key for that matching piece of software, then the software is allowed to continue. Of course, the wrong key or the absence of such a key prevents the operation of the software. Copies of the software can be duplicated easily permitting backup copies to be made. However, much effort is spent in the industry to prevent the unauthorized duplication of the hardware or otherwise emulating the hardware by making the algorithm producing the key difficult to decode which prevents or deters the unauthorized use of multiple copies without an identical key for each identical copy.

In order to facilitate mass distribution of software by the developer, the software is replicated en masse without regard to individualization. Accordingly, hardware devices are generally supplied identically, but under the manufacturer's control and distribution. Each device contains a code that is unique to a given piece of software or application product. If it is desired to purchase additional but different types of software, other unique coded hardware devices must be supplied for each of the protected software applications or new version of software, which eventually presents a problem in logistics.

First, the end user begins to acquire a multitude of hardware units which must generally share the same port as well as increasing the volume of space required to store all of the hardware as well as the time consumed in properly identifying them and associating them with each piece of software. Second, in the event that other modules or software that work in conjunction with the original distributed software are acquired at a later time, additional keys must be obtained which may impose further distribution problems. Third, for many reasons, such as registering the rightful owner of the original software, providing updates and other marketing and economic reasons, software developers have resorted to serialization of the software per se at the time of manufacture as well as requiring mail-in registration cards for verification and control of the legal end use of the product. Serialization of the software requires special handling and equipment and presents problems of logistics. The present invention is directed to the amelioration of these problems which still permit mass replication of the software desired to be protected while preventing the unauthorized use of such software.

SUMMARY OF THE INVENTION

Accordingly, it is an object of the present invention to provide a new and improved method and apparatus for protecting one or more copies of computer software in a unique and beneficial manner.

Another object of this invention is to provide a new and improved method and apparatus of protecting computer software which may utilize many dissimilar keys for operating the same software.

Another object of this invention is to provide a new and improved method and apparatus for protecting computer software which eliminates the need for requiring a multitude of hardware units which generally share the same computer port for the protection of related software programs.

Still another object of this invention is to provide a new and improved method and apparatus for protecting computer software which eliminates the need for providing additional keys for use with software or other modules that work in conjunction with previously distributed software and further, eliminates the necessity of serialization of the software thereby reducing the requirement of special handling for such serialization by the manufacturer.

Still another object of the present invention is to provide a new and improved method and apparatus for the protection of computer software of the multiple or related copy types which is easy to implement and provides the developer with complete control and eliminates third parties from interfering with the integrity of the software developer and end user relationship.

In carrying out this invention in one illustrative embodiment thereof, a method of protecting computer software is provided by coupling a hardware device having a first key and a second key stored therein with the first key being permanently established. The hardware device is interrogated using an access sequence generated by the computer software which is desired to be protected. Outputs are generated from the hardware device indicative of the first key and the second key from which is extracted a control key using an algorithm which processes the first and second keys to produce a control key even though a plurality of outputs from the hardware device are processed to produce the control key. The control key is used to prevent the unauthorized use of the software desired to be protected by employing the control key derived using the first and second keys as well as the algorithm.

BRIEF DESCRIPTION OF THE DRAWINGS

The invention, together with further objects, aspects, features and advantages thereof will be more clearly understood from the following description taken in connection with the accompanying drawings.

DESCRIPTION OF THE PREFERRED EMBODIMENTS

Figure 1:
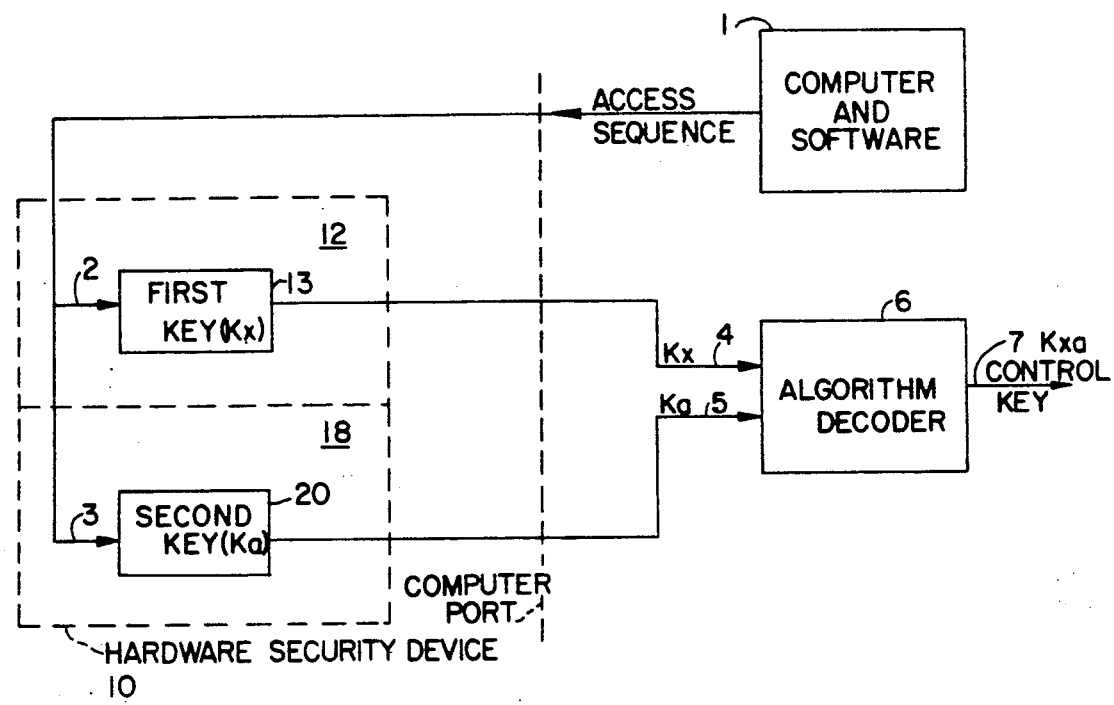
FIG. 1 is a block diagram of the computer software protection system in accordance with the present invention.

Referring now to FIG. 1, a hardware security device, referred to generally with the reference numeral 10, comprises two sections 12 and 18. Section 12 contains a first key 13 in the form of a code Kx and a second key 20 containing yet another code Ka. The hardware device is coupled to computer and software 1 which provides an access sequence to the hardware security device 10. When the software is run in the computer, appropriate access sequences 2 and 3 are issued to the first key 13 and the second key 20, respectively, providing outputs 4 and 5 which are indicative of the codes Kx and Ka, respectively. The outputs 4 and 5 representing Kx and Ka, respectively, are applied to the algorithm decoder 6 producing a resultant control key 7 represented by Kxa which is used and further manipulated by normal means as previously disclosed in the prior art to allow authorized access to the protected portion of the software which is desired to be protected.

The control key 7, Kxa, is the resultant of an algorithm and two other keys, namely, Kx and Ka. The control key 7 Kxa does not exist in precoded form, but only as a derivation from the two other keys and an algorithm. For purposes of security, Kx must reside in the supplied hardware 10 under the control of the developer, whereas, Ka, may reside in the supplied hardware security device 10, but is not restricted thereto. For example, Ka may be entered through a separate port such as that which connects the keyboard to the computer. The algorithm can also be included in any part of the software, the computer hardware or any combination thereof.

Assuming that the algorithm function is a simple exclusive OR, Table I illustrates several values of Kx and Ka, which if XOR'ed will yield the same Kxa.

TABLE I

| | | |
|---|---|---|
| $Kx0 = 1101$ | $Ka0 = 1001$ | $Kx0 =$ |
| $Kx1 = 1011$ | $Ka1 = 1111$ | $0100$ |
| $Kx2 = 0110$ | $Ka2 = 0110$ | |
| . | . | |
| . | . | |
| $Kxn = 1010$ | $Kan = 1110$ | |

Since the control key 7 is constant Kxa, it will be apparent that identical software keyed to Kxa will always run with any identical Kxa. Since other combinations of Kx and Ka will produce the same Kxa as illustrated in this example, many apparently different keys will operate the identical software. From the simple four bit illustration for Kx there are only $2^4$ or 16 such keys out of a possible 256 combinations of eight bits. Other combinations and limitations can be chosen by design.

It will be appreciated that the previous example which employs four bits for the first key Kx and the second key Ka are merely chosen for purposes of understanding and are not to be construed as any limitation on the invention. Furthermore, the particular algorithm 6 namely, XOR'ing the first and second keys 13 and 20 is merely chosen for purposes of illustration and does not constitute a limitation on the present invention. There are literally an infinite number of algorithms which can produce the desired results, and the complexity or simplicity of the choice of the algorithm is left to its designer. In designing systems to be effective, at least one section 12 or 18 of the security device 10 must not be easily duplicated or emulated. Simply as illustrative, this portion is designated as section 12 which contains a hardware coded element 13 which effectively yields the code Kx when interrogated by the access sequence 2. To prevent tampering by the end user, Kx should remain permanent once established. In addition, to reduce the possibility of emulating the access sequence 2 in producing the response 7 by some other device or circumvention directly through the software means, the algorithm for extracting the code from Kx should be complex. However, the value or code Kx must remain readable and not secret in order to provide protection to many non-identical groups of software discussed hereinafter. In addition, the function of the algorithm should be made kept secret and complex to prevent reverse engineering. Finally, there must be a sufficient number of possible but invalid combinations of Ka for each value of Kx to prevent trial and error searches for Kxa within a practical length of time.

If Kx cannot be changed but can be read, the complex algorithm and the required value Kxa remains secret, and the number of combinations of Ka large, then the probability of determining the necessary value of Ka to operate the software within a reasonable length of time become prohibitive. Based on this assumption, the contents of Ka may be altered and may be allowed to be altered without regard to security. There will be at least one value of Ka for each given value of Kx that will operate the software. However, the possible number of Ka values must be large so that trial and error efforts to determine the value of Ka will be impractical.

Figure 2:
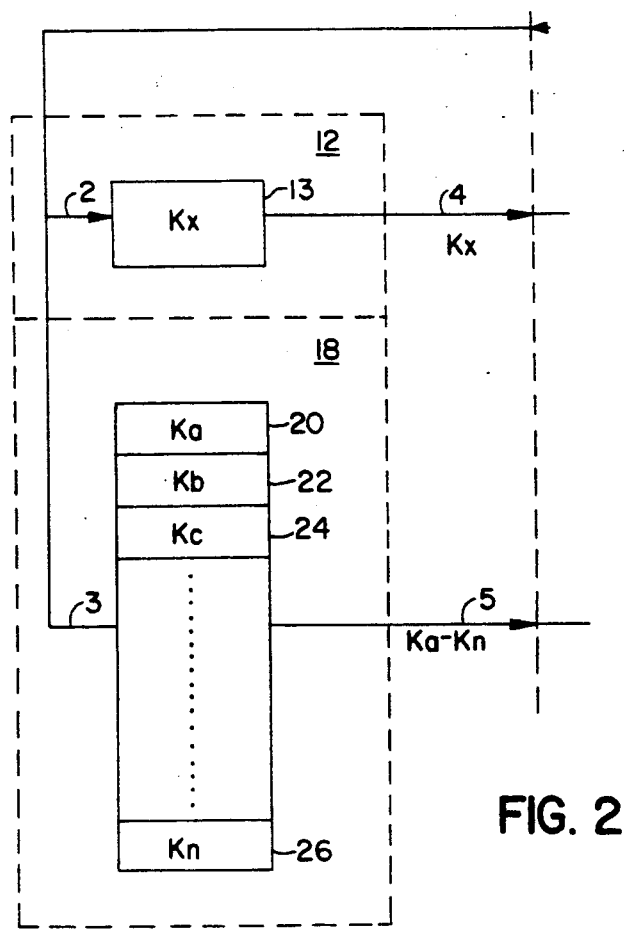
FIG. 2 is a block diagram of a modification of the computer software protection apparatus having a multiplicity of second keys.

Referring now to FIG. 2, instead of providing a single value Ka 20 stored in section 18, section 18 is provided with a plurality of elements 22, 24, 26, etc. providing a plurality of storage areas needed to store keys Ka through Kn, one for each protected application module, access, etc. for the software. Assuming that it is possible to freely read and write information to and from one of the areas 22, 24, etc., it will be apparent that the stored values, for example, Kb and Kc can provide two new keys Kxb and Kxc, which can be made available for other applications such as additional software, modules, etc. Table II below illustrates that each value of Kx (Kx0, Kx1, and Kx2), a different value of Kb (Kb0, Kb1, and Kb2) is required to produce a given key Kxb and similarly, for Kxc.

TABLE II

| | | | | |
|---|---|---|---|---|
| $Kx0 = 1101$ | $Kb0 = 0110$ | $Kxb =$ | $Kc0 = 1100$ | $Kxc =$ |
| $Kx1 = 1011$ | $Kb1 = 0000$ | $1011$ | $Kc1 = 1010$ | $0001$ |
| $Kx2 = 0110$ | $Kb2 = 1101$ | | $Kc2 = 0111$ | |
| . | . | | . | |
| . | . | | . | |
| $Kxn = 1010$ | $Kbn = 0001$ | | $Kcn = 1011$ | |

It will be appreciated that when different Ka through Kn are used different algorithms may be employed for each Ka through Kn giving a different but particular control key for each Kxa through Kxn.

Figure 3:
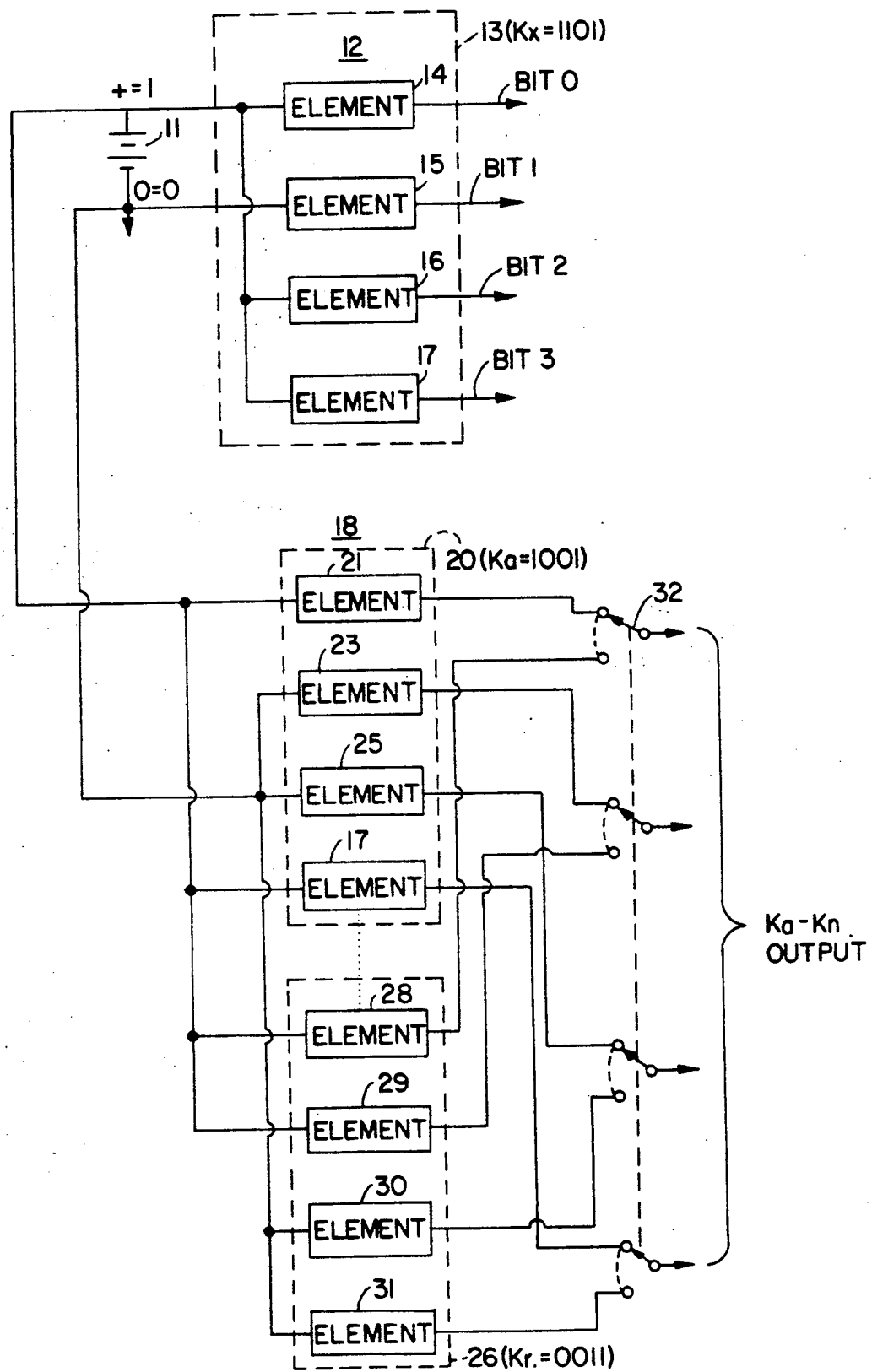
FIG. 3 is a block circuit diagram illustrating a more detailed embodiment illustrating the first and second keys utilized in combination with an algorithm to provide a control key in accordance with the present invention.

FIG. 3 illustrates an example of a single implementation using a four bit code for Kx, and Ka through Kn. A battery 11 is coupled to elements 14, 15, 16 and 17 of section 12 as illustrated producing the Kx code 13 of 1101 representing bit 3 through bit 0, respectively. In FIG. 3, the output Kx is illustrated as a parallel output which can also be represented by serial outputs by sequential selection. The battery 11 is also connected to section 18 as shown. Code 20 (Ka) is formed by elements 21, 23, 25 and 27 while code 26 (Kn) is formulated by elements 28, 29, 30 and 31. For Ka, the four bit code is 1001 while for Kn, the code is 0011. The individual elements 14 through 17 of section 12 as well as 21, 23, 25 and 27 of Ka 20 and 28 through 31 of Kn 26 are all individual elements which can be wire, memory cells, flip-flops, storage register element cells, programmable memory cells, etc. Any of these elements may be utilized to provide the desired code which has been selected in accordance with the particular design utilized to carry out the present invention. The outputs from section 18 are provided by a gang switch 32 to provide Ka through Kn outputs. The outputs can further be selected by means of a multiplex switch which are controlled by addressing methods common in computer hardware.

Accordingly, the problem of distributing protected software is ameliorated by the present invention. Identical packs of protected software may be mass replicated and released with a hardware security device 10 with Kx in Section 12 supplied with random values. Corresponding areas of section 18 are loaded with the corresponding correct values of Ka through Kn for each given Kx providing the appropriate key values Kxa through Kxn, each such control key being used for a corresponding piece of software desired to be protected. At any time that it is desired to allow access to another additional section of software, it is only necessary to load an appropriate value into the key area that corresponds to this additional software. The value of Kx is read and transferred to the software developer which may be necessary if Kx has been distributed at random, who can then provide the matching correct code Ka through Kn for each additional software module that is needed to be operative. This step can easily be performed by telephone eliminating the need to ship software or additional keys.

To prevent additional unauthorized activation of the software through the duplication of the contents of memory of the elements Ka through Kn from a sister device which has been authorized and with the proper codes Ka through Kn implanted, it is necessary to create a unique value of Kx for every hardware device so that no identical twin(s) exists. This can readily be accomplished through ordinary means if EPROM's or similar storage devices are used and is only slightly more inconvenient than programming Kx with the same value. As a practical matter, Kx does not have to have an infinite number of values as chance of finding the same key is improbable.

However, if the value of Kx is truly unique, such that only one value exists for a given piece of software, then Kx can readily be a substitute for serialization of software itself which make replication of the software a simple process. Additionally, it would be unnecessary to mail in a confirmation of the registration. The software can be made to run only upon receipt of the necessary value of Ka, Kb, Kc, etc. which can only be obtained from the developer and only after all pertinent facts have been given at the request of the developer. Accordingly, the developer has complete control over the licensing of the software eliminating third parties from interfering with the integrity of the software developer and the end user relationship. It is understood that for purposes of this disclosure, software will include data files, applications, netware, operating systems, etc. which are to be protected using this invention.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A method of protecting computer software using a combination of computer hardware and software comprising the steps of:

permanently establishing a first key in a hardware device;

providing and storing a second key in said hardware device;

plugging said hardware device having said first key and said second key stored therein into a computer utilizing software which is desired to be protected for establishing a communications path between the hardware device and computer;

interrogating said first and second keys in said hardware device using an access sequence generated by the computer software which is desired to be protected;

generating output from the hardware device indicative of said first key and said second key;

extracting a single control key by applying said first key and said second key to an algorithm which processes said first and second keys to produce a control key;

generating a plurality of second keys any of which when processed by a given algorithm along with said first key produce a corresponding control key;

preventing the unauthorized use of software desired to be protected using said control key.

2. A combination of computer hardware and software means for protecting computer software comprising a hardware device having first and second sections for generating first and second keys, respectively, coupled to said computer operating on software that is desired to be protected;

means for permanently establishing said first key in said first section of said hardware;

software means for providing an access sequence to said first and second sections of said hardware means for generating said first and second keys, respectively;

algorithm decoder means coupled to said hardware means for decoding an algorithm using said first and second keys and providing a control key output which is used to protect said software;

said second section of said hardware device has a plurality of second keys each of which when processed along with said first key by an algorithm decoder means provides the said control key.

* * * * *